(12) United States Patent
Blankenship et al.

(10) Patent No.: US 6,971,824 B2
(45) Date of Patent: Dec. 6, 2005

(54) LOCKING NOSEPIECE AND TEMPLATE

(75) Inventors: Thomas O. Blankenship, St. Charles, MO (US); Kenneth D. Harper, O'Fallon, MO (US); Brian J. Martinek, Troy, MO (US); James L. Morrison, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 386 days.

(21) Appl. No.: 10/430,544

(22) Filed: May 6, 2003

(65) Prior Publication Data

US 2004/0223821 A1    Nov. 11, 2004

(51) Int. Cl.[7] ............................................. B23B 45/14
(52) U.S. Cl. ........................................... 408/97; 408/3
(58) Field of Search ........................ 408/3, 4, 95, 97, 408/110, 130, 712

(56) References Cited

U.S. PATENT DOCUMENTS

| | | | | |
|---|---|---|---|---|
| 2,451,123 A * | 10/1948 | Schultz | ................... | 408/241 R |
| 3,575,519 A * | 4/1971 | Bruner et al. | ................. | 408/97 |
| 5,131,793 A * | 7/1992 | Luebbert | ..................... | 408/101 |
| 5,161,923 A * | 11/1992 | Reccius | ..................... | 408/72 R |
| 5,482,411 A * | 1/1996 | McGlasson | ................. | 408/1 R |
| 5,746,552 A * | 5/1998 | Tsui et al. | ................. | 408/72 B |
| 5,947,656 A * | 9/1999 | Simson et al. | ................ | 408/97 |
| 6,196,779 B1 * | 3/2001 | Falk | ......................... | 411/54.1 |
| 6,872,036 B2 * | 3/2005 | Linderholm | ................ | 409/200 |

* cited by examiner

Primary Examiner—Boyer D. Ashley
Assistant Examiner—J Williams
(74) Attorney, Agent, or Firm—Alston & Bird LLP (57) ABSTRACT

An apparatus for forming features in a workpiece is provided. The apparatus includes a nosepiece that engages a boss of a template and guides a tool member therethrough. The nosepiece includes a housing and an adjustable member positioned at least partially in an interior space of the housing. The adjustable member defines radial apertures that hold locking members such as spherical bearings. The locking members are configured to contact a tapered portion of the inner surface of the housing so that as the adjustable member is adjusted from an unlocked position to a locked position, the locking members contact the tapered portion of the housing and are urged radially inward to retain the boss.

25 Claims, 5 Drawing Sheets

LOCKING NOSEPIECE AND TEMPLATE

BACKGROUND OF THE INVENTION

1) Field of the Invention

The present invention relates to an apparatus for engaging a tool with a workpiece and, more particularly, a nosepiece that can be secured to a template or another device to support a tool, such as a drill, proximate to a workpiece.

2) Description of Related Art

During the manufacture of a workpiece, it is often desirable to form features such as holes at a number of predetermined locations. Manual layout and forming of the holes by an operator is a relatively inexpensive method of manufacture but is time-consuming and labor-intensive, and the accuracy of such a method is limited by the ability of the operator. Alternatively, automation of the process, for example, with a computer numerical controlled (CNC) machine or a robot, can result in high accuracy but is also typically expensive. Further, due to the geometrical configuration of some workpieces, it may be difficult or impossible to use a CNC machine or robot to access some portions of the workpiece to form the features.

Alternatively, guide devices are sometimes used to quickly identify the desired locations for the holes, which can then be formed manually. For example, a conventional strip template can be formed of a sheet of steel or other sufficiently rigid material that can be bent or otherwise configured to correspond to the contour of a portion of the workpiece. The strip template defines a number of holes, each hole corresponding to the desired location of one of the holes on the workpiece. Cylindrical, tube-like structures, referred to as bosses, extend through each of the holes in the plate. The bosses can be longer than the thickness of the plate so that each boss extends from a side of the plate that is opposite the workpiece. Each boss also has a bushing therein. An operator uses the strip template by first aligning the template on the workpiece, for example, according to two or more pre-drilled features on the workpiece, and connecting the template to the workpiece using clamps, pins, or the like. The operator then marks the workpiece, for example, by spraying paint through the bosses to apply circular marks of paint on the workpiece at the desired locations of the holes. The operator can then remove the template from the workpiece and drill a hole through the workpiece at each painted mark. Alternatively, the operator can drill the holes through the bosses of the template instead of applying the paint. However, because the operator may be unable to precisely maintain the drilling device in the desired relationship with the bushing and template, the operator typically uses a drill bit that is somewhat smaller than the desired size of the holes to form pilot holes while the template is in place. These pilot holes are subsequently redrilled to enlarge the holes to the desired size after the template has been removed. In either case, using the template is time-consuming, and the placement and angle of the holes is affected by the skill of the operator. For example, if it is desired to form the holes normal to the surface of the workpiece, the operator must hold the drill so that the bit is normal to the workpiece. Further, the operator may be fatigued quickly due to the torque and the normal force that he or she must apply to resist the rotation of the drill and advance the drill bit through the workpiece.

Drill plates are sometimes utilized to facilitate the formation of high quality drilled holes in a workpiece. A drill plate is typically formed of a fixture that supports one or more drills in a fixed configuration and an additional tooling structure that connects the workpiece and the fixture so that the drills are directed toward the workpiece to form the holes in the desired configuration. Each of the drills can be self-feeding, i.e., each drill can automatically advance a respective drill bit into the workpiece. The drill plate resists the torque and normal forces associated with drilling, thereby reducing operator fatigue. Further, because the fixture of the drill plate supports the drills, the placement and orientation of the drills and, hence, the holes, can be accurately controlled. However, drill plates are typically expensive and require significant time for set up. Additionally, the drill plates are expensive to manufacture and maintain, and each drill plate may not be useful for forming more than one particularly configured workpiece.

Thus, there exists a need for an apparatus for forming features, such as holes, in a workpiece. The apparatus should be compatible with complex shapes and should not require an undue amount of time for forming the features. In addition, the apparatus should allow the features to be located and oriented accurately and should not require excessive skill or physical exertion on the part of the operator.

BRIEF SUMMARY OF THE INVENTION

The present invention provides an improved apparatus for forming features in a workpiece. The apparatus can support a tool, such as a drill, proximate to a workpiece so that the tool can drill a hole or otherwise form a feature in the workpiece. Advantageously, the apparatus includes a nosepiece that can be easily secured to a boss in a predetermined location relative to the workpiece. The boss can be defined by a template, which can correspond to the geometrical configuration of the workpiece. Further, the apparatus allows the tool to be accurately positioned and operated without undue effort on the part of the operator.

According to one embodiment of the present invention, the apparatus includes a nosepiece that engages a boss of a template and guides a tool member therethrough. The tool member can be actuated by a tool, for example, a drill bit that is rotated and extended by a drill. The apparatus can include the template, which can be configured to be disposed against the workpiece. The template defines at least one hole and boss disposed at a predetermined position. The nosepiece includes a housing and an adjustable member positioned at least partially in an interior space of the housing. The adjustable member defines radial apertures that hold locking members such as spherical bearings. The locking members are configured to contact a tapered portion of the inner surface of the housing so that as the adjustable member is adjusted from an unlocked position to a locked position, the locking members contact the tapered portion of the housing and are urged radially inward to retain the boss. For example, each boss can define a groove, and the locking members can extend into the groove when the adjustable member is locked. The nosepiece can also be configured to engage the drill or other tool, thereby securing the tool to the boss. A bushing can extend through the bore of the adjustable member and receive the tool member therethrough.

According to one aspect of the invention, the nosepiece is configured to receive a pressurized fluid in the interior space of the housing for axially adjusting the adjustable member. For example, fluid connectors can provide the fluid to a portion of the interior space of the housing proximate an end of the adjustable member such that the fluid received through one of the connectors exerts an axial force on the adjustable member and urges the adjustable member to the locked position. A switch can be configured to selectively connect a fluid source to the nosepiece, thereby adjusting the adjustable member and engaging the nosepiece to the boss. Further, the switch can also be configured to rotatably actuate the drill or other tool.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
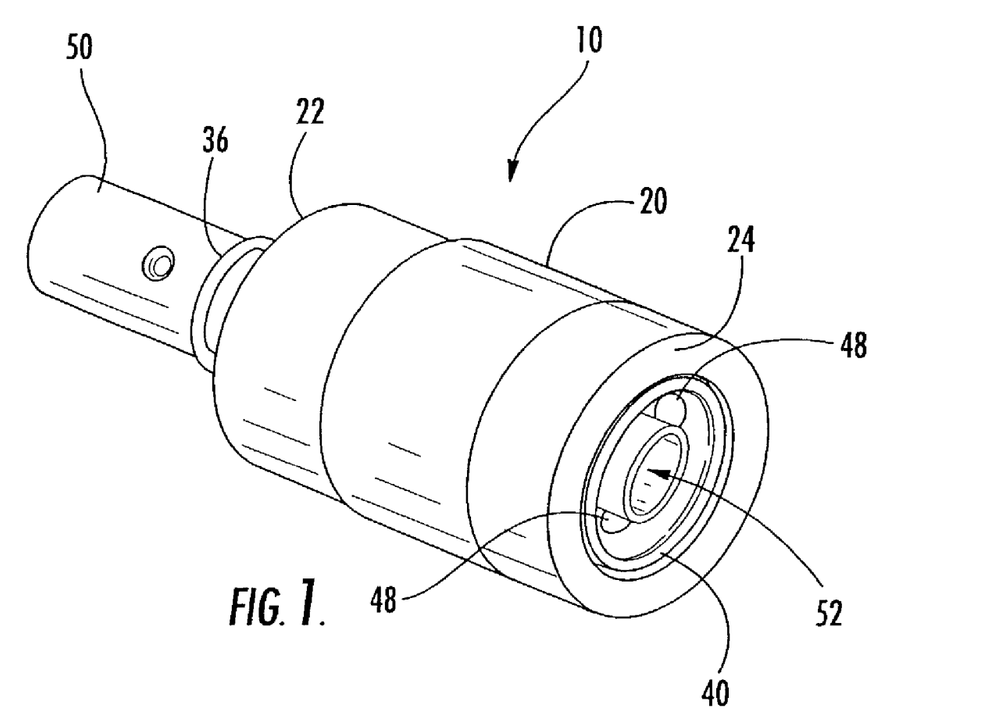
FIG. 1 is a perspective view of a pneumatic nosepiece according to one embodiment of the present invention.

Referring now to the figures and, in particular, FIG. 1, there is shown a locking nosepiece 10 for engaging a boss 64 (FIG. 2) and guiding a tool member through the boss 64. The nosepiece 10 can be used in conjunction with a variety of tools and tool members for performing various functions on a workpiece. For example, the nosepiece 10 can be connected to a drill and sequentially used to guide a rotatable drill bit through a plurality of the bosses 64 provided on a template 60. Alternatively, the nosepiece 10 can be connected to another rotational or linear actuator and used to guide a different tool member such as a reamer, punch, and the like for forming holes, depressions, or other features in the workpiece.

Figure 3:
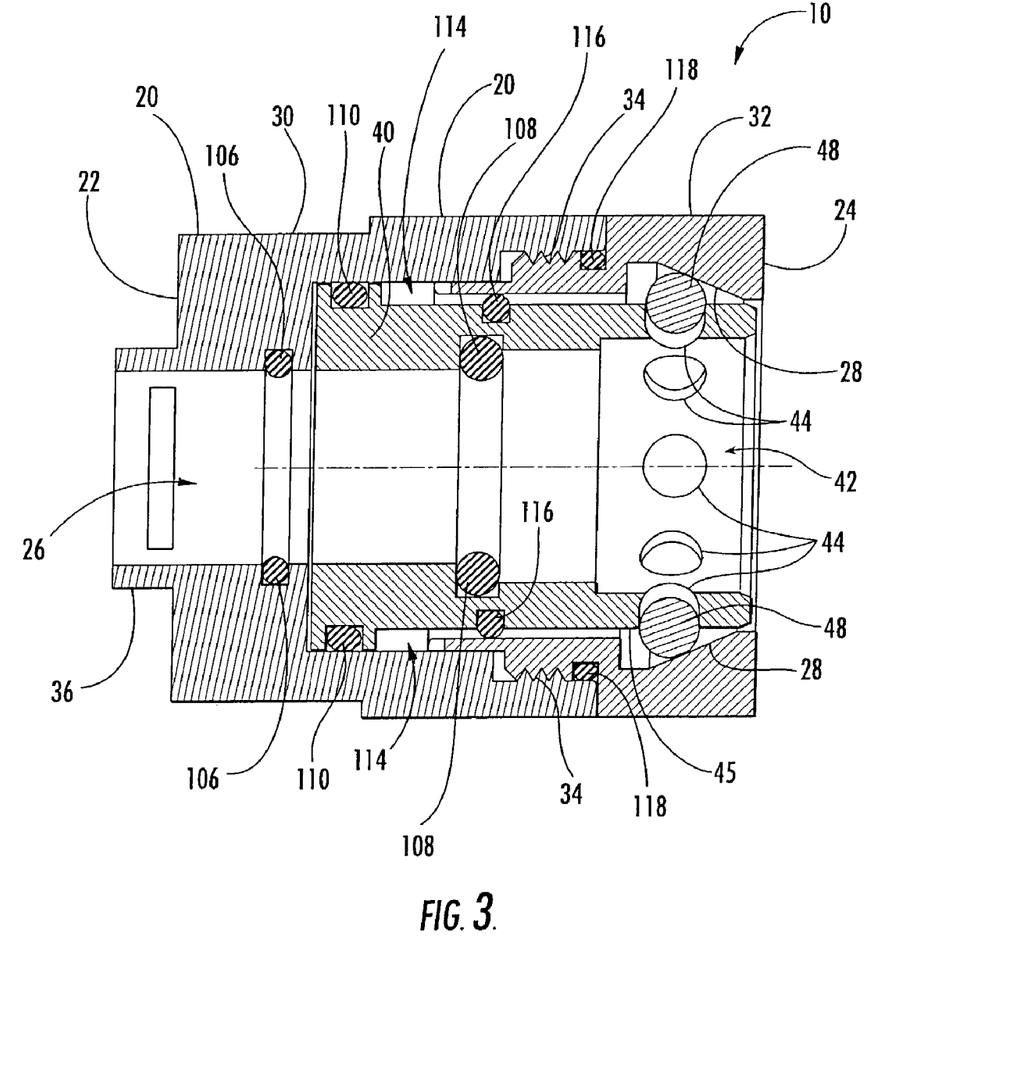
FIG. 3 is a section view in elevation of the nosepiece of FIG. 1, shown with the adjustable member in a retracted, unlocked configuration.
Figure 4:
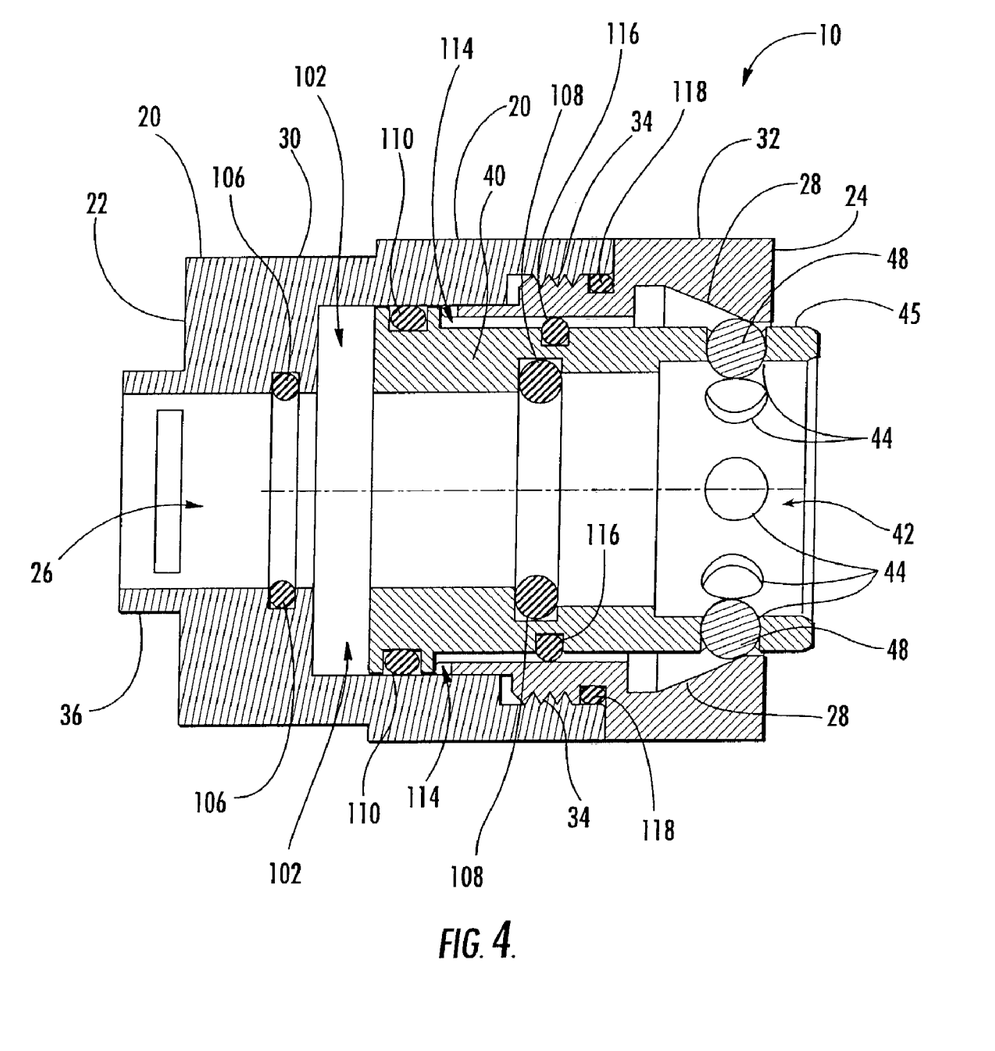
FIG. 4 is a section view in elevation of the nosepiece of FIG. 1, shown with the adjustable member in an extended, locked configuration.

According to one embodiment of the present invention illustrated in FIGS. 3 and 4, the nosepiece 10 is formed of a tubular housing 20 and a tubular adjustable member 40. The housing 20 extends axially from a first side 22 to a second side 24 and defines an interior space 26 extending between the first and second sides 22, 24. The interior space 26 generally defines a circular cross section, though the interior space 26 can vary in diameter over the length of the housing 20. For example, an inner surface of the housing 20 proximate the second side 24 of the housing 20 defines a tapered portion 28 that tapers in a radially inward direction toward the second end 24.

The adjustable member 40 is adjustably disposed at least partially in the housing 20, and the housing 20 can be configured to retain the adjustable member 40 at least partially therein. As shown in FIG. 3, the housing 20 can be formed of multiple members, such as a drill-side member 30 and a boss-side member 32, each of which defines corresponding threads 34 for connecting the two members 30, 32. When assembled, the housing 20 retains the adjustable member 40 such that the adjustable member 40 can be adjusted axially, i.e., extended or retracted in the housing 20. The extent of the possible adjustment of the adjustable member 40 is determined by the size and contour of the adjustable member 40 and the inner surface of the housing 20. In one embodiment, the adjustable member 40 can be axially adjusted between about 0.1 and 0.5 inches.

The adjustable member 40 defines an axial bore 42 and at least one radial aperture 44. Each of the apertures 44 (8 in the illustrated embodiment) is configured to receive a lock bearing, such as a spherical ball bearing, or other locking member 48. For purposes of illustrative clarity, only two of the lock members 48 are shown in FIGS. 3 and 4. Each aperture 44 can extend radially from an outer surface 45 of the adjustable member 40 to the bore 42 extending therethrough, and each aperture 44 can taper slightly in the radially inward direction so that the lock members 48 are received by the apertures 44 through the outer surface 45 of the adjustable member 40 but are prevented from passing therethrough into the bore 42. The apertures 44 open into, and are generally directed toward, the tapered portion 28 of the inner surface of the housing 20. Thus, when the adjustable member 40 is retracted in the housing 20, as shown in FIG. 3, the lock members 48 are free to be moved radially outward from the bore 42 of the adjustable member 40. However, when the adjustable member 40 is extended, i.e., adjusted axially in a direction from the first side 22 of the housing toward the second side 24, as shown in FIG. 4, the lock members 48 contact the tapered portion 28 and are adjusted radially inward to extend into the bore 42 of the adjustable member 40.

Figure 2:
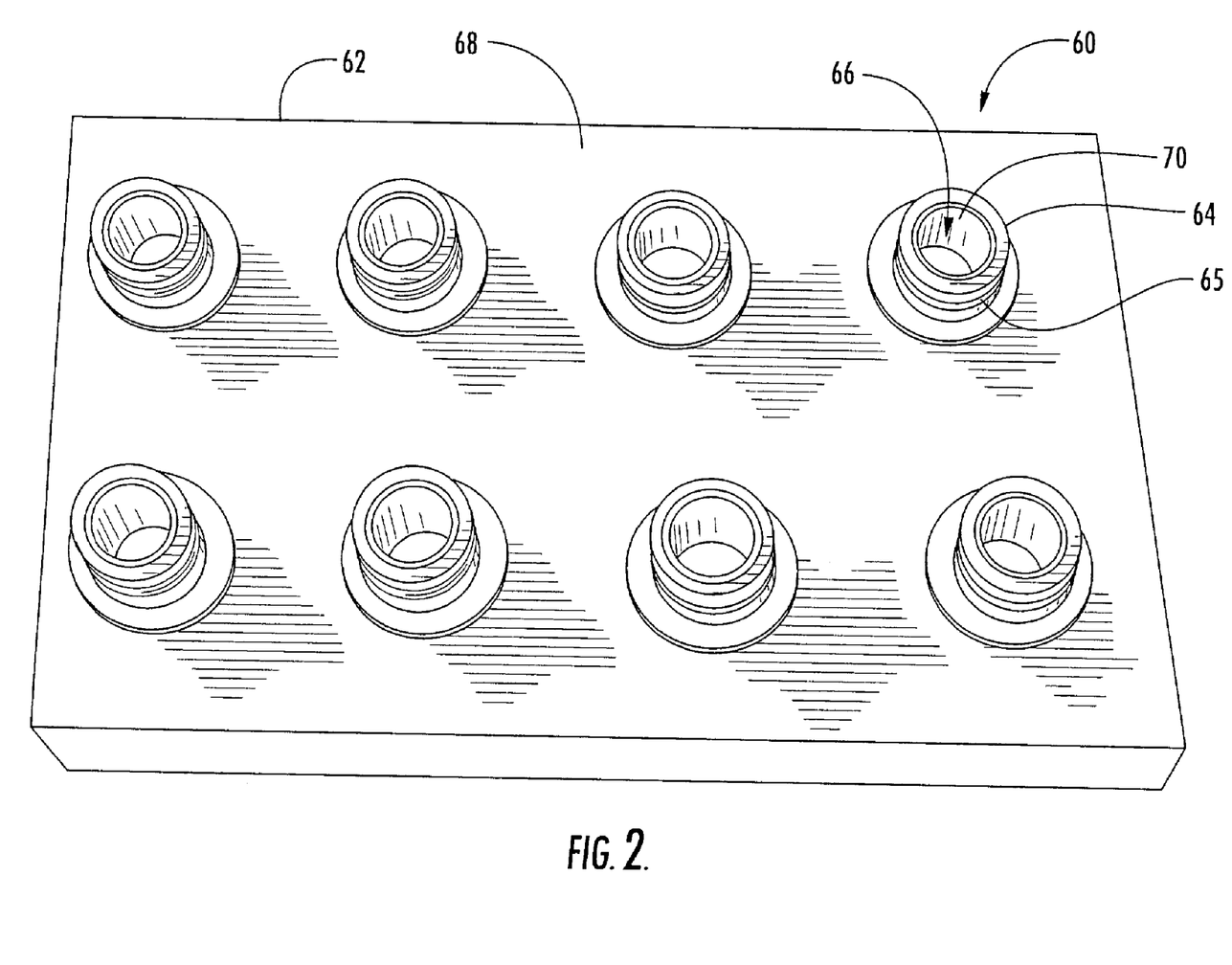
FIG. 2 is a perspective view of a template according to one embodiment of the present invention.

The nosepiece 10 is configured to engage the bosses 64 on the template 60. As illustrated in FIG. 2, the template 60 includes a sheet or plate 62, which generally corresponds to a portion of the workpiece so that the sheet 62 can be disposed against the workpiece. Although the illustrated template 60 is generally flat, in other embodiments, the template 60 can define a complex contour that corresponds to the workpiece. Holes 66 in the sheet 62 correspond to locations where features are desired to be located on the workpiece. The bosses 64 are tube-like components that are fixed to the sheet so as to extend through each of the holes 66 and protrude from a side 68 of the sheet 62 that is disposed opposite to the workpiece. The sheet 62 and the bosses 64 can be formed of a variety of structural materials such as stainless steel, and the bosses 64 can be welded, screwed, or otherwise connected to the sheet 62. Each boss 62 may include a bushing 70 extending therethrough, and the bushings 70 can be formed of a low friction material such as a polymer. The bushings 70 can be larger than the desired size of the feature that is to be formed in the workpiece.

The outer diameter of each of the bosses 64 on the template 60 corresponds to and is generally slightly smaller than the bore 42 of the adjustable member 40 so that each boss 64 can be received by the nosepiece 10. Further, the outer surface of each boss 64 defines a circumferential groove 65 that extends radially inward and corresponds in position and size to the lock members 48. When the adjustable member 40 is retracted to the unlocked position and the lock members 48 are permitted to adjust radially outward, the boss 64 can be inserted into the adjustable member 40 so that the lock members 48 are positioned proximate to the groove 65. Then, as the adjustable member 40 is extended to the locked position, the lock members 48 are adjusted radially inward into the groove 65 of the boss 64, thereby securing the nosepiece 10 to the boss 64 until the adjustable member 40 is returned to the unlocked position. Thus, the nosepiece 10 can be selectively engaged, or locked, to the bosses 64 and, hence, the template 60. According to other embodiments of the present invention, the nosepiece 10 may be differently configured such that other movements or adjustments of the adjustable member 40 cause the locking members 48 to move radially inward or outward. For example, the locking members 48 can be moved radially inward when the adjustable member 40 is retracted and released radially outward when the adjustable member 40 is extended.

Figure 5:
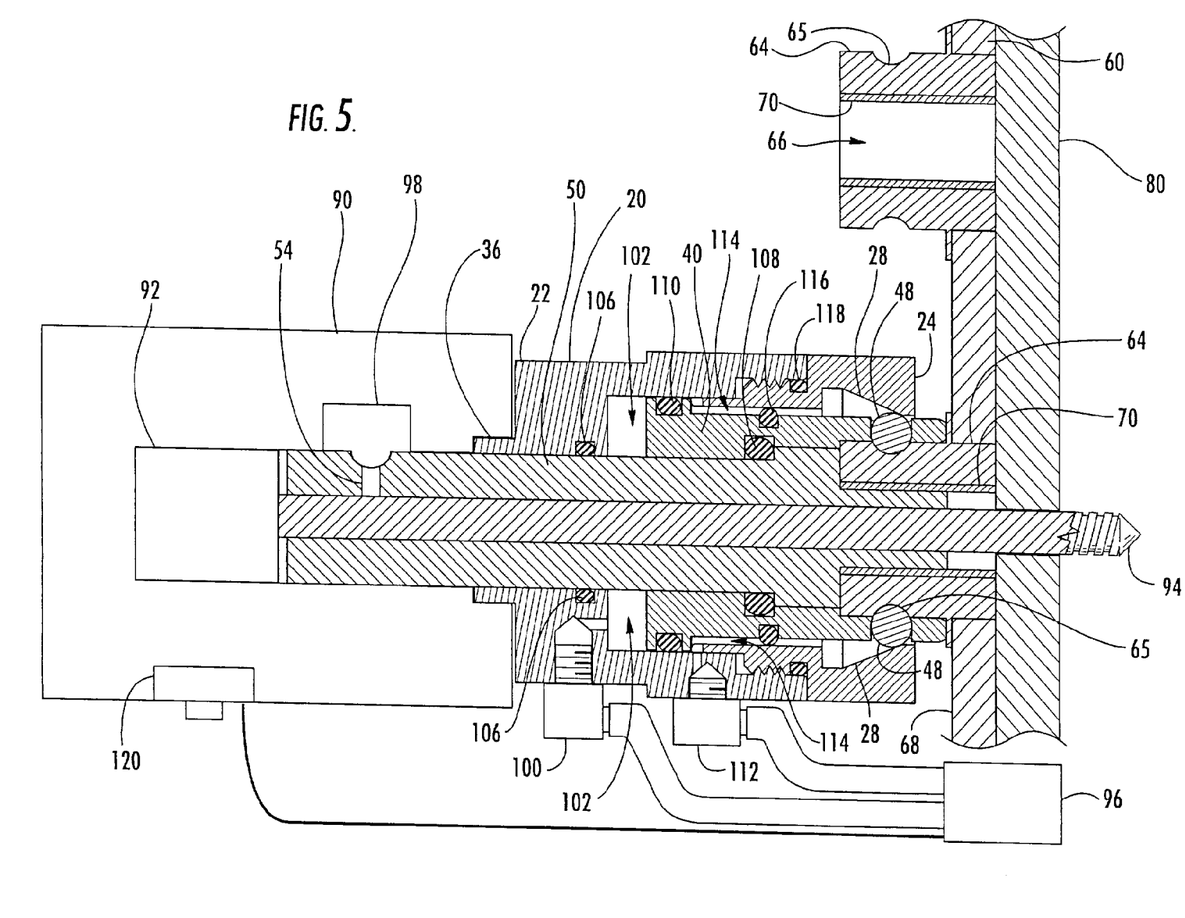
FIG. 5 is a section view in elevation of the nosepiece of FIG. 1, shown with a bushing, drill, and drill bit configured to drill a workpiece.

The nosepiece 10 is shown in the locked position in FIG. 5, with the nosepiece 10 engaged to one of the bosses 64 of the template 60. The template 60 is positioned proximate to the workpiece 80, and secured thereto by one or more bolts or other connection devices such as screws, pins, clamps, and so forth, in a desired configuration so that the bosses 64 are coincident with the desired locations of the features. Thus, the nosepiece 10 is connected to the workpiece 80. Further, the first side 22 of the housing 20 of the nosepiece 10 defines a connector 36, such as a slotted ring, key slot, bolt hole, pin, or the like, that can be engaged to a tool such as a hydraulic, pneumatic, or electric drill 90. The drill 90 includes a rotary actuator 92 configured to engage and rotate a drill bit 94. The drill bit 94 can be configured to drill holes in the workpiece 80 directly to the desired size without first drilling a pilot hole. Further, the drill 90 can be self-feeding, i.e., the drill 90 can be configured to automatically advance the drill bit 94 axially into the workpiece 80 to form a hole in the workpiece 80. For example, the actuator 92 can be configured to advance the drill bit 94 axially while rotating. Advantageously, the nosepiece 10 and the template 60 connect the drill 90 to the workpiece 80 and resist the linear and rotational forces exerted by the drill 90, i.e., a reactionary rotational force in the direction opposite to the rotation of the drill bit 94 and a reactionary linear force in the direction opposite to the axial advancement of the drill bit 94. Thus, the nosepiece 10 reduces the physical exertion required of the operator. Further, the nosepiece 10 can be configured to direct the drill bit 94 at a predetermined angle relative to the workpiece 80, without relying on the operator to hold the drill 90 at the desired angle, thereby improving the precision of the drilling procedure.

A bushing 50 disposed in the nosepiece 10 extends into the drill 90 and receives the drill bit 94 through a bore 52 extending through the bushing 50. The bushing 50 extends through the nosepiece 10 and into the boss 64 to support the drill bit 94. Preferably, the bushing 50 is formed of a low friction material such as a polymer, so that the bushing 50 retains the drill bit 92 in a substantially straight configuration while applying a minimal frictional load on the drill bit 92. In addition, the bushing 50 can correspond to the shape of the bore 42 of the adjustable 40 member, as shown in FIG. 5, and can be configured to fit inside the boss 64. The bushing 50 can also define an aperture 54 extending radially outward from the base 52, through which debris can be removed from the bore 52. Thus, as the drill 90 forms a hole, material removed from the workpiece 80 can travel through the bore 52 and through the aperture 54 to a receptacle 98 in the drill 90.

The nosepiece 10 can be manually actuated, i.e., manually engaged and disengaged, by axially adjusting the housing 20 and adjustable member 40 relative to one another. Alternatively, the nosepiece 10 can be fluidly actuated, for example, by fluidly connecting the nosepiece 10 to a source 96 of pressurized fluid, such as a compressor, pump, or vessel configured to supply pressurized air or other fluids to the nosepiece. Fluid connectors can be provided on the nosepiece 10 for supplying the pressurized fluid to one or more portions of the interior space 26 of the housing 20. For example, as shown in FIG. 5, a first fluid connector 100 selectively provides fluid through a passage to a space 102 proximate the first end 22 of the housing 20 and an end of the adjustable member 40 so that when the space 102 is pressurized, the fluid urges the adjustable member 40 in the axial direction away from the first end 22 of the housing 20, thereby extending the adjustable member 40 to the locked configuration. Seals can be provided to prevent fluid from exiting the space 102. For example, the housing 20 can define a circumferential groove with an o-ring 106 disposed therein, the o-ring 106 fluidly sealing the housing 20 to the bushing 50. Similarly, the adjustable member 40 can define grooves with o-rings 108, 110 for sealing the adjustable member 40 to the bushing 50 and to the housing 20. Further, pressurized fluid can also be selectively provided through a second fluid connector 112 and passage to a second space 114 such that when the pressurized fluid is delivered to the second space 114 the adjustable member 40 is adjusted axially in a direction from the second end 24 of the housing 20 toward the first end 22, i.e., the adjustable member 40 is retracted in the housing 40 so that the locking members 48 can be adjusted radially outward. The second space 114 can be sealed by the o-ring 110 between the adjustable member 40 and the housing 20, an o-ring 116 provided between the adjustable member 40 and the boss-side member 32 of the housing 20, and an o-ring 118 between the drill-side and boss-side members 30, 32 of the housing 20.

The flow of fluid through the connectors 100, 112 and, hence, into and out of the spaces 102, 114 in the nosepiece 10, can be selectively controlled by the operator. For example, one or more fluid switches 120 configured to control the flow of the fluid from the pressurized fluid source 96 to the nosepiece 10 can be provided on the nosepiece 10 or elsewhere, such as on the drill 90. According to one embodiment of the present invention, the switch 120 that controls the flow of the fluid and, hence, the operation of the nosepiece 10, also controls the operation of the drill 90. For example, the switch 120 can electrically or pneumatically control the drill 90 and the fluid source 96. Thus, by actuating the switch 120 on the drill 90, the operator can lock the nosepiece 10 to one of the bosses 64 and start the drilling operation, which can then proceed automatically in the case of a self-feeding drill.

According to one method of operation of the present invention, the template 60 is provided with a shape, size, and pattern of holes 66 and bosses 64 that correspond to the workpiece 80. The template 60 is connected to the workpiece 80, for example, by inserting a connector such as a bolt or pin through the workpiece 80 and the template 60. The operator can insert the bushing 50 into the nosepiece 10, connect the nosepiece 10 to the drill 90 using the connector 36, and connect the nosepiece 10 to the source 96 of pressurized fluid. To form the first feature, the operator engages the nosepiece 10 with one of the bosses 64 on the template 60. For example, if the nosepiece 10 is pneumatically operated, the operator can actuate the switch 120 to a first position to release or evacuate air from the first space 102 in the nosepiece 10 and allow air to flow into the second space 114, thereby retracting the adjustable member 40. The locking members 48 can be urged radially outward by a spring (not shown) or can be pushed outward by the boss 64 as the operator advances the nosepiece 10 axially against the template 60 so that the adjustable member 40 receives the boss 64 into the bore 42. The operator can then actuate the switch 120 to a second position to release the air from the second space 114 and instead allow air to flow into the first space 102, thereby extending the adjustable member 40 and forcing the locking members 48 radially inward into the groove 65 of the boss 64 so that the boss 64 is engaged to the nosepiece 10 and retained thereby. Thus, the drill 90 is then connected to and supported by the boss 64 and, hence, the workpiece 80. The drill 90 can be a self-feeding device so that the operator need only actuate the drill 90, for example, by actuating the switch 120, and the drill 90 then begins a drilling process in which the drill bit 94 is rotated and urged axially against the workpiece 80 to form a hole therethrough. When the drilling operation is complete, the operator can again actuate the switch 120 to the first position to release the nosepiece 10 from the boss 64 and then reconnect the nosepiece 10 and, hence, the drill 90 to another boss 64 to repeat the drilling process at another predetermined location on the workpiece 80. It is understood that some of the foregoing operations can be omitted and other operations can be performed without departing from the scope of the invention.

Many modifications and other embodiments of the invention set forth herein will come to mind to one skilled in the art to which this invention pertains having the benefit of the teachings presented in the foregoing descriptions and the associated drawings. For example, the apparatus described herein can be used to locate and/or form features other than holes in the workpiece, such as depressions, joints, and the like. Further, the tool used to form the features can be a tool other than a drill. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A nosepiece for engaging a boss and guiding a tool member therethrough, the nosepiece comprising:
    a housing extending in an axial direction between first and second ends, the housing defining an interior space therein and an inner surface having a tapered portion;
    an adjustable member positioned at least partially in the interior space of the housing and axially adjustable therein between unlocked and locked positions, the adjustable member defining a bore extending therethrough in the axial direction for receiving the tool member and at least one aperture extending radially inward from an outer surface of the adjustable member and opening into the tapered portion of the housing; and
    at least one locking member disposed in the at least one aperture of the adjustable member,
    wherein the at least one locking member is configured to contact the tapered portion of the housing and be urged radially inward thereby as the adjustable member is adjusted from the unlocked position to the locked position such that the at least one locking member is configured to engage the boss with the adjustable member.

2. A nosepiece according to claim 1 wherein the at least one locking member comprises at least two spherical bearings.

3. A nosepiece according to claim 1 wherein the housing comprises first and second connected members configured to retain the adjustable member at least partially in the interior space of the housing.

4. A nosepiece according to claim 1 wherein the nosepiece defines a connector configured to engage a tool configured to actuate the tool member such that the nosepiece is configured to secure the tool to the boss.

5. A nosepiece according to claim 1 wherein the nosepiece is configured to receive a pressurized fluid in the interior space of the housing for axially adjusting the adjustable member.

6. A nosepiece according to claim 5 further comprising a fluid connector and a passage extending from the connector to a portion of the interior space of the housing proximate an end of the adjustable member such that the fluid received through the connector exerts an axial force on the adjustable member, thereby urging the adjustable member to the locked position.

7. A nosepiece according to claim 5 wherein the housing is configured to receive the fluid in at least two portions of the interior space such that the fluid adjusts the adjustable member alternately between the locked and unlocked positions.

8. A nosepiece according to claim 1 wherein the tapered portion tapers toward the second end of the housing such that the adjustable member is extended in a direction from the first end of the housing toward the second end when locked, and the adjustable member is retracted in a direction from the second end of the housing toward the first end when unlocked.

9. A nosepiece according to claim 1 further comprising a bushing disposed in the interior space of the housing and at least partially through the bore of the adjustable member, the bushing defining a bore configured to receive the tool member therethrough such that the tool member is configured to be moved relative to the bushing.

10. An apparatus for engaging a drill to a workpiece and drilling a hole in the workpiece, the apparatus comprising:
    a housing extending in an axial direction between first and second ends, the housing defining an interior space therein and an inner surface having a tapered portion tapering toward the second end, the first end being configured to connect to the drill;
    an adjustable member positioned at least partially in the interior space of the housing and axially adjustable therein between unlocked and locked positions, the adjustable member defining a bore extending therethrough in the axial direction and a plurality of apertures extending radially through the adjustable member and opening into the tapered portion of the housing;
    a rotatable drill bit extending through the housing and the bore of the adjustable member, the drill bit configured to rotatably engage the drill; and
    a plurality of lock bearings, the lock bearings being disposed in the apertures of the adjustable member,
    wherein each lock bearing is configured to contact the tapered portion of the housing and be urged radially inward thereby as the adjustable member is extended axially in a direction from the first end of the housing toward the second end such that the lock bearings are configured to engage the boss.

11. An apparatus according to claim 10 wherein the housing comprises first and second connected members configured to retain the adjustable member at least partially in the interior space.

12. An apparatus according to claim 10 wherein the nosepiece is configured to receive a pressurized fluid in the interior space of the housing for axially adjusting the adjustable member.

13. An apparatus according to claim 12 further comprising at least one fluid seal for retaining the fluid in the housing.

14. An apparatus according to claim 12 wherein the housing defines a fluid connector and a passage extending from the connector to a portion of the interior space of the housing proximate an end of the adjustable member such that the fluid received through the connector exerts an axial force on the adjustable member, thereby urging the adjustable member to the locked position.

15. An apparatus according to claim 12 further comprising a switch configured to fluidly connect a fluid source to the nosepiece, thereby adjusting the adjustable member and engaging the nosepiece to the boss.

16. An apparatus according to claim 16 wherein the switch is configured to rotatably actuate the drill.

17. An apparatus according to claim 10 further comprising a bushing disposed in the interior space of the housing and at least partially through the bore of the adjustable member, the bushing configured to receive the drill bit therethrough.

18. An apparatus according to claim 10 further comprising the drill, wherein the drill is configured to rotate and extend the drill bit, thereby drilling the hole in the workpiece.

19. An apparatus for supporting a tool proximate to a workpiece, the apparatus comprising:
   a template configured to be disposed against the workpiece, the template defining at least one hole and boss disposed at a predetermined position, the boss extending from a surface of the template and defining a circumferential groove extending radially inward; and
   a nosepiece comprising:
      a housing extending in an axial direction between first and second ends, the housing defining an interior space therein and an inner surface having a tapered portion;
      an adjustable member positioned at least partially in the interior space of the housing and axially adjustable therein between unlocked and locked positions, the adjustable member defining a bore extending therethrough in the axial direction for receiving the boss and a plurality of apertures extending radially through the adjustable member and opening into the tapered portion of the housing; and
      a plurality of lock bearings, each bearing being disposed in one of the radial apertures of the adjustable member,
   wherein each bearing is configured to contact the tapered portion of the housing and is thereby urged radially inward as the adjustable member is adjusted from the unlocked position to the locked position such that the bearings are configured to engage the groove of the boss and support the nosepiece relative to the boss.

20. An apparatus according to claim 19 wherein the housing comprises first and second members configured to retain the adjustable member at least partially in the interior space.

21. An apparatus according to claim 19 wherein the first end of the housing defines a connector configured to engage the tool.

22. An apparatus according to claim 19 wherein the nosepiece is configured to receive a pressurized fluid in the interior space of the housing for axially adjusting the adjustable member.

23. An apparatus according to claim 22 wherein the housing defines a fluid connector and a passage extending from the connector to a portion of the interior space housing an end of the adjustable member such that the fluid received through the connector exerts an axial force on the adjustable member, thereby urging the adjustable member to the locked position.

24. An apparatus according to claim 19 wherein the tapered portion tapers toward the second end of the housing such that the adjustable member is extended in a direction toward the second end of the housing when locked and the adjustable member is retracted in a direction toward the first end of the housing when unlocked.

25. An apparatus according to claim 19 further comprising a bushing disposed in the interior space of the housing and at least partially through the bore of the adjustable member, the bushing configured to receive a tool member that is actuated by the tool.

\* \* \* \* \*